Figure 1:
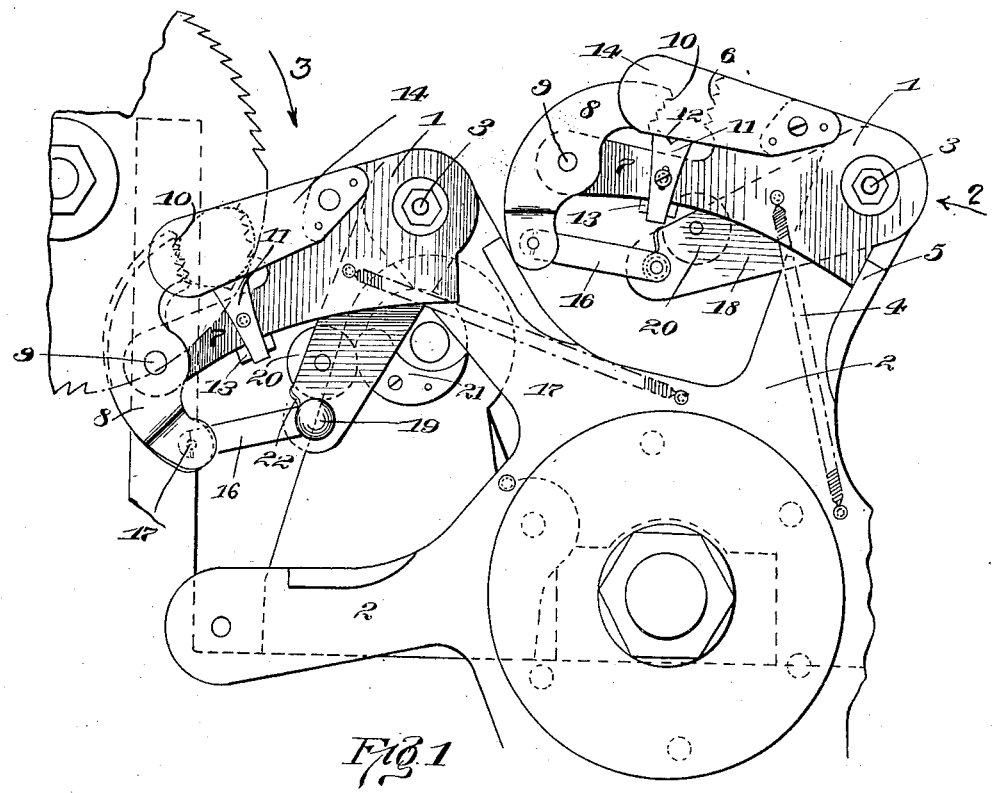

T. F. MORRISSEY.
WORK HOLDER.
APPLICATION FILED NOV. 6, 1911.

1,062,547.

Patented May 20, 1913.

2 SHEETS—SHEET 1.

WITNESSES:
Philip S. McLean.
Vernon J. Houghton

INVENTOR
Thomas F. Morrissey
BY
Brock Beeken & Smith
ATTORNEYS

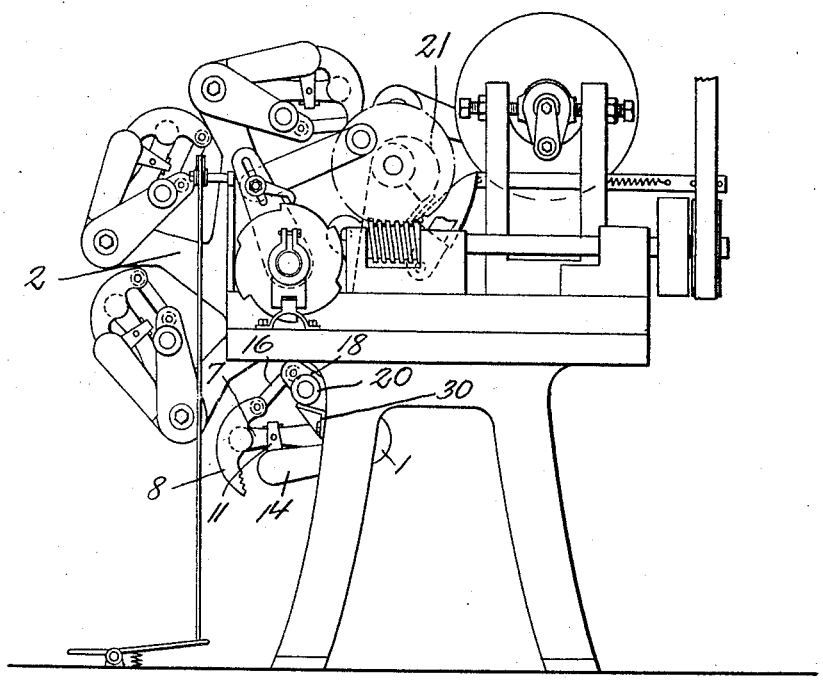

UNITED STATES PATENT OFFICE.

THOMAS F. MORRISSEY, OF WEST ORANGE, NEW JERSEY, ASSIGNOR TO UNITED BUTTON COMPANY, A CORPORATION OF NEW YORK.

WORK-HOLDER.

1,062,547. Specification of Letters Patent. Patented May 20, 1913.

Original application filed July 25, 1910, Serial No. 573,799. Divided and this application filed November 6, 1911. Serial No. 658,710.

*To all whom it may concern:*

Be it known that I, THOMAS F. MORRISSEY, a citizen of the United States, and a resident of West Orange, in the county of Essex and State of New Jersey, have invented certain new and useful Improvements in Work-Holders, of which the following is a specification.

The object of my invention is to provide a work-holder that can be used in connection with certain machines, and particularly that type of machine which is used in the sawing of ivory nuts.

The art of sawing ivory nuts is made very difficult by their irregular shape and the consequent disadvantage they offer to being held tightly in a work-holder.

My invention provides, among other things, means for holding an irregular shaped object such as an ivory nut in the proper position with reference to the working part—in this case a saw, and also means for increasing the grip on the work when presented to the saw to insure rigidity.

The present application is a division of application Serial No. 573,799, filed July 25, 1910, and issued as Patent No. 1,019,720.

Briefly my invention consists of a supporting member carrying a fixed jaw, a movable member also provided with a jaw, pivoted to the supporting member, and a cradle mounted to coöperate with the jaws in positioning and gripping the work. Gages are also preferably mounted on the supporting member substantially inclosing the jaws and cradle so as to form a pocket or receptacle for the work. This serves to position the work when placed therein, so that each piece of work will be acted upon in the same manner, or, as in the present case, be cut by the saw along corresponding lines. Connecting the supporting member and the movable jaws, I provide a toggle the links of which serve when acted upon by hereinafter described means to operate the movable jaw. The supporting member is preferably pivotally connected to a carrier and means such as a cam, are employed to act on a roller, situated on the toggle, to swing the holder out around the said pivotal connection, and at the same time increase the closing force of the jaws on the work, the cam being situated so that these operations take place when the carrier has positioned the work-holder adjacent to the saw.

Other features of my invention will be disclosed as the specification proceeds.

A preferred form of my invention is embodied in the accompanying drawings but many modifications can take place without departing from the spirit or scope of the invention.

Figure 2:
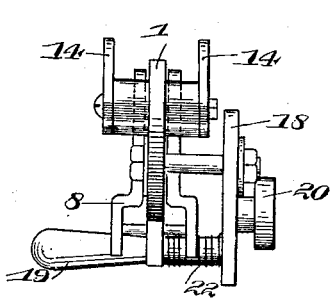
Figure 3:
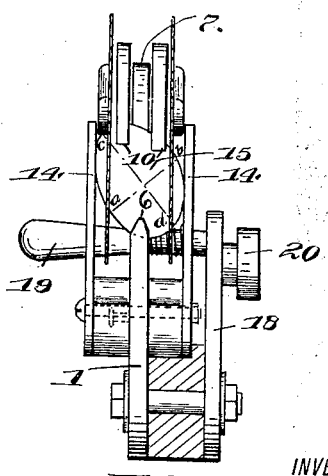

In these drawings: Figure 1 is a side elevation of a portion of a carrier, suitable for carrying my work-holders with two of such holders mounted thereon. Fig. 2 is an end view of one of the work-holders, looking in the direction of the arrow 2, Fig. 1. Fig. 3 is a top view of one of the work-holders, looking in the direction of the arrow 3, Fig. 1. Fig. 4 is a general view showing a number of work holders mounted on the carrier.

In these several views like reference characters refer to corresponding parts.

The supporting members 1, being one or more as the case may be, are preferably pivoted at one end to a suitable carrier 2. These supporting members 1 are free to swing around their pivotal supports 3, but are normally held inward by suitable means such as springs 4. These springs hold the supporting members 1 normally against suitable abutments provided on the carrier such as stops 5. A fixed jaw 6 is provided on each supporting member, which jaw is preferably situated about midway between the extremities of the supporting members, the remaining portion 7 of the supporting member acting as an arm to the end of which a lever 8 (preferably double) is pivoted. This lever thus straddles the arm 7 of the supporting member 1 and is pivoted at a point 9 intermediate its ends, thereby acting as a lever of the first class. The working arm of this lever 8 is provided with jaws 10 which coöperate with the fixed jaw 6, and a cradle 11 pivoted to the supporting member 1. This cradle is preferably constructed so as to straddle the supporting member in order that it may present double jaws 12 to the work. This construction also allows a cushion 13 to be placed between the back of the cradle and the supporting member in such a way as to cause a reaction of the cradle when work is clamped down upon it and it is caused to swing.

Gages 14 are secured to the supporting member 1 which substantially inclose the jaws and the top of the cradle so that the work is always held in substantially the same position. This is clearly represented in Fig. 3, in which 15 indicates the work, in this case an ivory nut. The gages 14 are spaced so that the distance between them is greater than the diameter $a$—$b$ of the nut and less than its length $c$—$d$. This being true, the nut will always be positioned at a proper angle between the jaws and so be presented to the saw in proper position to be worked upon.

A toggle is employed to operate the movable jaw, one link 16 of which is pivoted to the lever arm of the double lever 8 at 17. The other link 18 of the toggle is pivoted preferably to the pivot 3 on which the supporting member 1 swings. Means such as the handle 19 is used, preferably where the links join, to operate the toggle and the movable jaw—pressure on the handle to break the toggle will swing the lever 8 around its pivot and open the jaws; making or straightening the toggle tends to close the jaws. Means are preferably provided to throw the work-holders outwardly around their pivotal supports 3 and at the same time to increase the closing force on the work. These means may take the form of the rollers 20 carried by links 18, which rollers are engaged by a cam 21. The carrier advances the work-holder until it is in the proper relation to the saw—then cam 21 revolves and by engaging roller 20 swings the respective work-holder to carry the work into cutting contact with the saw. The action of this cam on the roller tends to make or straighten the toggle thereby swinging the lever 8 around its pivot and moving its jaws 10 into closer proximity to the fixed jaw 6. The work is consequently gripped much tighter at this point and is made absolutely rigid when it is presented to the saw to be cut. In order to keep the jaws normally closed, means such as the spring 22 are employed to tend to keep the toggle straightened, thereby retaining the jaws in the closed position. Automatic means can be employed, such as a cam 30 shown in Fig. 4, to engage the roller 20 at the proper time to open the jaws and allow the work to be removed.

The general shape of the work-holder is made such that it will be conveniently carried by the carrier to which it is connected. Any number of the work-holders can be employed depending upon the construction of the machine.

What is claimed is:

1. In a machine of the character set forth, a work-holder comprising: a fixed jaw, a movable jaw, a cradle pivotally supported at an angle to the fixed jaw, and means for exerting closing force on the movable jaw thereby holding the work against the fixed jaw and the cradle.

2. In a machine of the character set forth, a carrier, a work-holder comprising: a fixed jaw, a movable jaw, a cradle pivotally supported at an angle to the fixed jaw, means for exerting closing force on the movable jaw thereby holding the work against the fixed jaw and the cradle, and confining gages carried by the fixed jaw embracing the work at an angle to the fixed and movable jaws and at an angle to the cradle.

3. In a device of the character set forth, a work-holder comprising: a fixed jaw, a movable jaw, a cradle straddling the fixed jaw, cushioning means between the fixed jaw and said cradle, and means for operating the movable jaw.

4. A work-holder of the character set forth, comprising: a supporting member pivotally supported at one end and provided with a fixed jaw, a movable jaw pivoted on the opposite end of the supporting member, a toggle connected between the movable jaw and a center concentric with the pivotal support of the supporting member, and means acting on the toggle to normally hold the movable jaw in its closed position.

5. A work-holder of the character set forth, comprising a supporting member pivotally supported at one end and provided with a fixed jaw, a movable jaw pivoted on the opposite end of the supporting member, a cradle pivotally mounted on the supporting member at a point intermediate the relatively fixed and movable jaws, a toggle connected between the movable jaw and a center concentric with the pivotal support of the supporting member, and means acting on the toggle to normally hold the movable jaw in its closed position.

6. In a device of the character set forth, a carrier, a supporting member pivoted at one end to the carrier, and provided with a fixed jaw, a movable jaw pivoted on a center intermediate its ends to the opposite end of the supporting member, and a toggle for operating the movable jaw connected between the pivot on which the supporting member is mounted and the free outer end of the movable jaw.

7. In a device of the character set forth, a carrier, a supporting member pivoted at one end to the carrier and provided with a fixed jaw, a movable jaw pivoted on a center intermediate its ends to the opposite end of the supporting member, a cradle pivotally mounted on the supporting member at a point intermediate the relatively fixed and movable jaws, and a toggle for operating the movable jaw connected between the pivot on which the supporting member is mounted and the free outer end of the movable jaw.

8. In a device of the character set forth, a work-holder comprising a supporting member provided with a relatively fixed jaw, a jaw mounted on the supporting member, movable to coöperate with the fixed jaw, means for opening and closing the movable jaw with respect to the fixed jaw, a cradle mounted on the supporting member intermediate of the two jaws, and gages carried by the supporting member, substantially inclosing the jaws and the cradle for positioning the work between the jaws and cradle.

9. In a device of the character set forth, a carrier, a supporting member mounted on said carrier and provided with a relatively fixed jaw, a movable jaw pivoted on the supporting member on a center intermediate its ends so as to provide a lever arm for actuating the same, a toggle for operating the movable jaw, connected between the lever arm of the movable jaw and a relatively fixed point, a cradle pivoted on the supporting member to coöperate with the relatively fixed and movable jaws in holding the work, and gages on the supporting member substantially inclosing the jaws and cradle to provide a pocket for properly positioning the work between the jaws and cradle.

10. In a machine of the character set forth, a carrier, a work holder pivotally supported on said carrier comprising a fixed jaw, a movable jaw, means normally holding said movable jaw against said fixed jaw, means for opening said movable jaw, means acting upon said opening means to increase the closing force of the movable jaw against the fixed jaw and to swing the work holder outwardly around its pivotal support, and a cam for acting upon said opening means to move the movable jaw away from the fixed jaw.

11. In a machine of the character set forth, a carrier, a work holder pivotally supported on said carrier comprising a fixed jaw, a movable jaw, means normally holding said movable jaw against the fixed jaw, means for opening said movable jaw, and means for acting upon said work holder to increase the closing force of the movable jaw against the fixed jaw, and to swing the work holder outwardly around its pivotal support.

12. In a machine of the character set forth, a carrier, a work holder comprising a supporting member having a pivotal support on the carrier, a fixed jaw on said supporting member, a movable jaw pivotally connected to said supporting member on a center of support not coinciding with the center of support of the supporting member on the carrier, toggle links between the supporting member and the movable jaw, a cam, and means on one of said links adapted to be engaged by the cam to throw the work holder outwardly around its pivotal support and at the same time increasing the pressure of the movable jaw on the work.

13. In a machine of the character set forth, a carrier, a work holder comprising: a supporting member pivotally mounted on the carrier, a fixed jaw on said supporting member, a movable jaw pivotally mounted on said supporting member, toggles between the supporting member and one end of the movable jaw, means for acting upon said toggles to normally keep the jaws closed, means for acting upon said toggles to open the jaws, and means for acting upon said toggles to increase the closing force of the movable jaw against the fixed jaw and for causing the supporting member to swing outwardly around its pivotal support.

Signed at Springfield, in the county of Hampden and State of Massachusetts this 2nd day of November A. D. 1911.

THOMAS F. MORRISSEY.

Witnesses:
C. J. SPILL,
GURDON W. GORDON.

Copies of this patent may be obtained for five cents each, by addressing the "Commissioner of Patents, Washington, D. C."